United States Patent [19]
Treharne

[11] Patent Number: 5,696,485
[45] Date of Patent: Dec. 9, 1997

[54] METHOD FOR CHARGING A TRANSPONDER

[75] Inventor: William David Treharne, Farmington Hills, Mich.

[73] Assignee: Ford Global Technologies, Inc., Dearborn, Mich.

[21] Appl. No.: 746,058

[22] Filed: Nov. 6, 1996

[51] Int. Cl.⁶ .................................................. G08B 26/00
[52] U.S. Cl. ............... 340/505; 340/825.34; 340/825.31; 340/426; 307/10.4; 307/10.5; 342/44
[58] Field of Search ...................... 340/825.54, 825.31, 340/825.72, 825.34, 547, 425.5, 426, 543, 572; 235/382, 382.5; 342/51, 30, 44; 307/10.5, 10.4, 9.1–10.8

[56] References Cited

U.S. PATENT DOCUMENTS

| | | | |
|---|---|---|---|
| 5,523,746 | 6/1996 | Gallagher | 340/825.31 |
| 5,561,420 | 10/1996 | Kleefeldt et al. | 340/825.31 |
| 5,561,430 | 10/1996 | Knebelkamp | 342/44 |
| 5,616,966 | 4/1997 | Fischer et al. | 307/10.5 |
| 5,625,349 | 4/1997 | Disbrow et al. | 340/825.31 |

*Primary Examiner*—Jeffery Hofsass
*Assistant Examiner*—Daryl C. Pope
*Attorney, Agent, or Firm*—Roger L. May; Mark L. Mollon

[57] ABSTRACT

A method for charging a transponder using a transceiver, the method including the steps of powering the transceiver, emitting a transmit pulse from the transceiver, powering the transponder using the transmit pulse, generating a calibration signal with the transponder, transmitting the calibration signal to the transceiver, calibrating the transceiver based on the calibration signal received from the transponder, emitting a charge pulse from the transceiver to the transponder, and charging the transponder with the charge pulse.

10 Claims, 2 Drawing Sheets

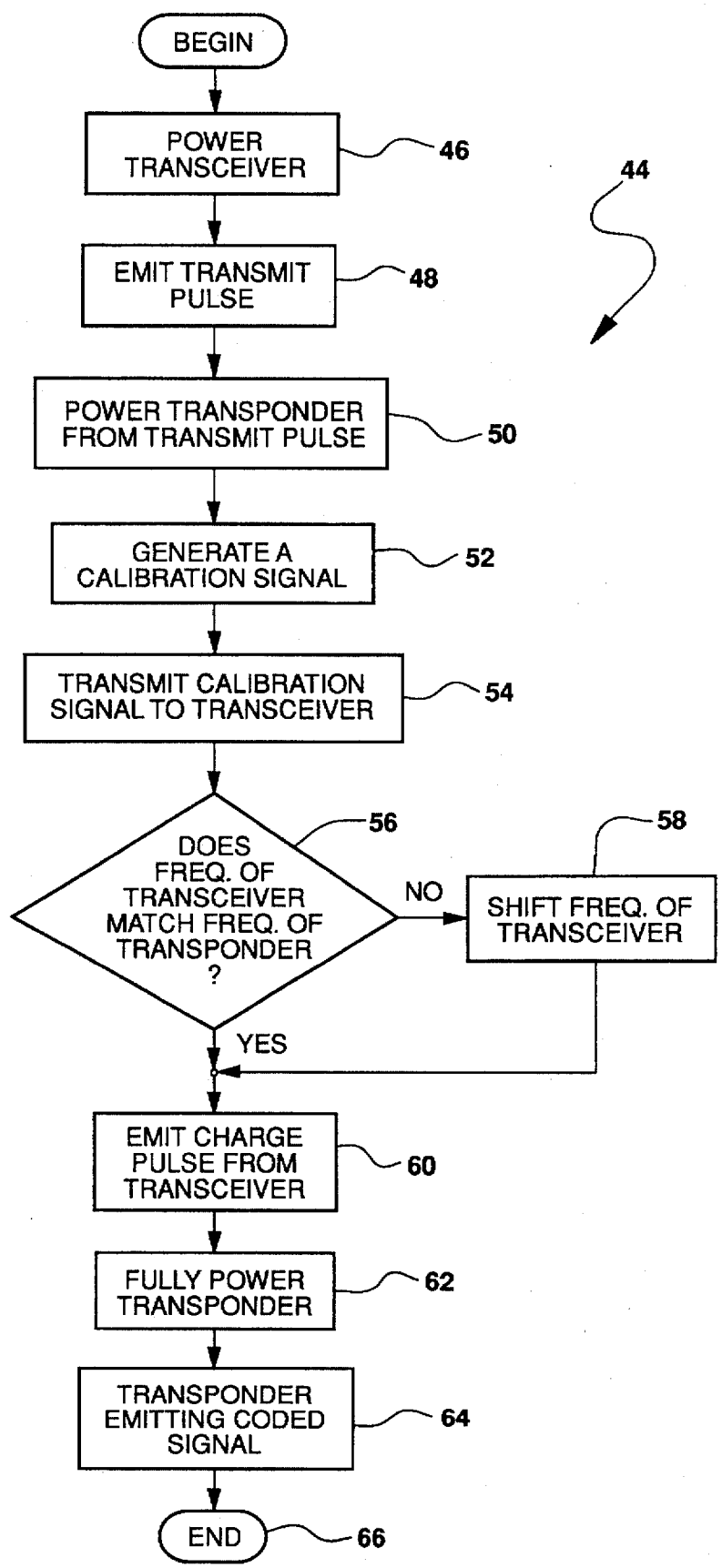

METHOD FOR CHARGING A TRANSPONDER

BACKGROUND OF THE INVENTION

1. Field of the Invention

The present invention relates to a method for charging a transponder and, more specifically, to a method for reducing the time required to charge a transponder.

2. Description of the Related Art

A transponder is a device which receives energy from a high energy signal and emits a second signal upon being charged. A transmitter or transceiver transmits the energy when it has been determined that conditions, i.e., location, orientation, are such that the transponder would be capable of receiving and storing the energy sent therefrom.

Transponders operate on a high Q resonant circuit. The transponders resonate between 125–135 kHz. The transponders are powered by receiving a high energy signal at the resonant frequency of the transponder from an external transmitter or transceiver.

A problem exists with the transponders in that the resonant frequency of the transponder varies from the environment in which it is placed and the temperature at which it is operating. More specifically, the transponder's resonant frequency varies based on the structure in which a transponder is placed. The result of these variances is a loss in the power efficiency between the transponder and the transceiver. This loss can prevent the transponder from fully charging, the result of which is that the transponder will be incapable of transmitting the second signal. Solutions to this problem include transmitting a higher powered signal to this transponder to overcome the efficiency loss. This solution is undesirable due to high cost and performance requirements. An added disadvantage of this solution includes potential interference by the transmission of a second signal from a second transponder which may be inadvertently charged due to the higher powered signal.

A second solution to this problem is to send a first charging signal to identify the resonant frequency of the transponder. After the frequency has been identified, the transceiver will send a second charging signal at the proper frequency to maximize the power efficiency. This solution is deficient in that it requires twice as much time to operate the transponder. This time consumption is not desirable.

Therefore, there is a need in the art to effectively transmit a signal to a transponder at the proper resonant frequency to maximize the efficiency of the transmitted power without adding additional costs, power, or time to the system.

SUMMARY OF THE INVENTION

Accordingly, a method for charging a transponder using a transceiver is disclosed. The method includes the step of powering the transceiver. Upon powering, the transceiver emits a transmit pulse. The method includes the step of powering the transponder using the transmit pulse. The method further includes the step of generating a calibration signal with the transponder. The method also includes the step of transmitting the calibration signal to the transceiver. The method further includes the step of calibrating the transceiver based on the calibration signal received from the transponder. The method further includes the step of transmitting a charge pulse from the transceiver to the transponder. The method also includes the step of charging the transponder with the charge pulse.

One advantage associated with the present invention is the ability to charge a transponder using a transceiver. Another advantage associated with the present invention is the ability to charge a transponder with a maximum power efficiency. Still another advantage associated with the present invention is the ability to calibrate a transceiver to transmit the high energy signal at a relative frequency corresponding to that of the transponder. Still another advantage associated with the present invention is the ability to maximize the power efficiency between a transceiver and a transponder without adding additional materials, energy, or parts. Still another advantage associated with the present invention is the ability to charge a transponder at maximum power efficiency within a reduced amount of time.

Other features and advantages of the present invention will be readily appreciated as the same becomes better understood after reading the subsequent description taken in conjunction with the accompanying drawings.

BRIEF DESCRIPTION OF THE DRAWINGS

FIG. 3 is a flow chart of a method according to the present invention.

DESCRIPTION OF THE PREFERRED EMBODIMENT(S)

Figure 1:
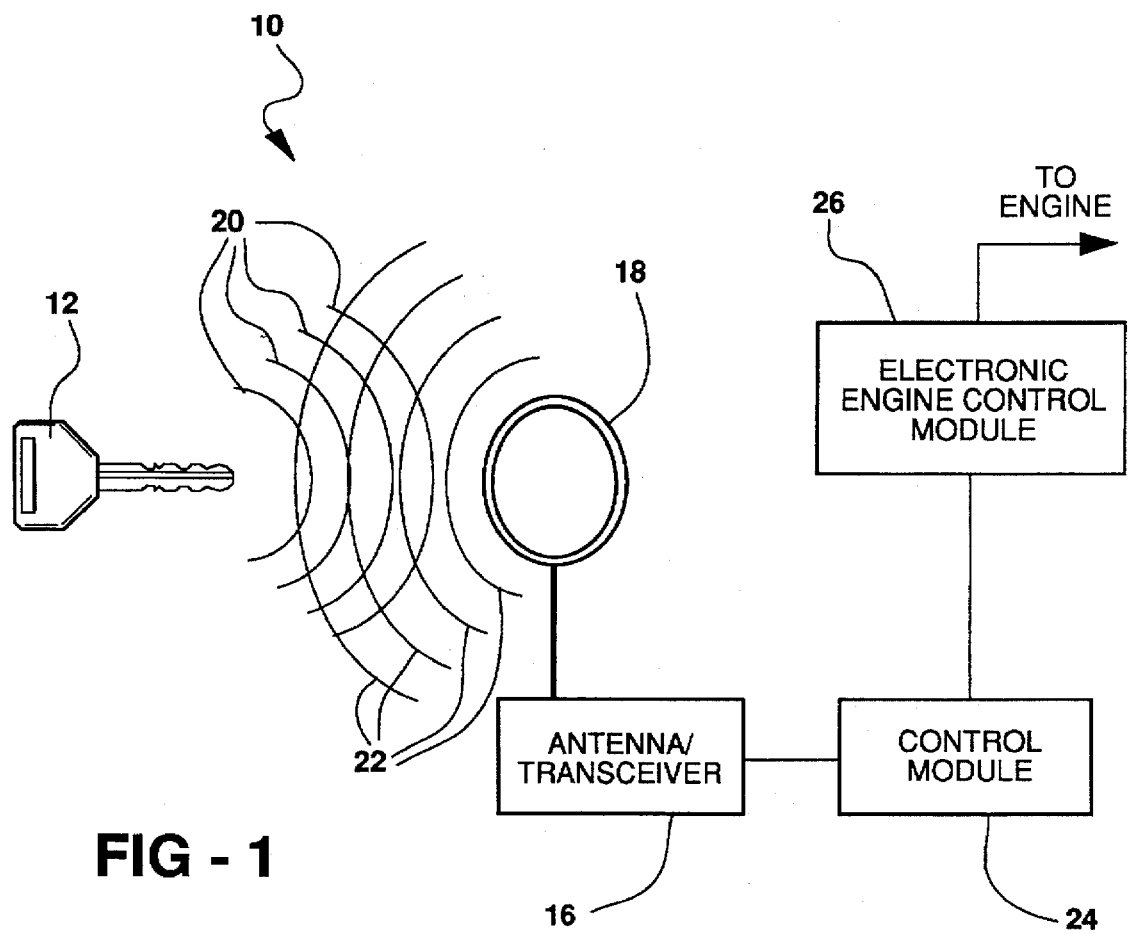
FIG. 1 is a block diagram of one embodiment of the present invention.

Referring to FIG. 1, a passive anti-theft system is generally indicated at 10. The passive anti-theft system includes an ignition key 12 which includes therein a transponder 14, best shown in FIG. 2. The passive anti-theft system 10 also includes a transceiver 16 and antenna 18. Wave forms 20, 22 graphically represent signals sent between the transponder 14, located inside the ignition key 12, and the antenna 18, respectively. The transceiver 16 is controlled by a control module 24. The control module 24 is in communication with electronic engine control module 26. The electronic engine control module 26 is in communication with the engine and controls the engine based on various inputs received from control modules such as the control module 24.

When the transceiver 16 is instructed that an ignition key 12 is being inserted into the steering column to start the motor vehicle (not shown), the transceiver 16 sends via the antenna 18, a power signal to charge the transponder 14 so that the transponder 14 can identify the ignition key 12 as the proper ignition key for that particular motor vehicle. If the signal 20 sent by the transponder 14 does not correspond to what is stored in the control module 24, the control module 24 does not send a start command to the electronic engine control module 26. The absence of a start command prevents the motor vehicle from being operated.

Figure 2:
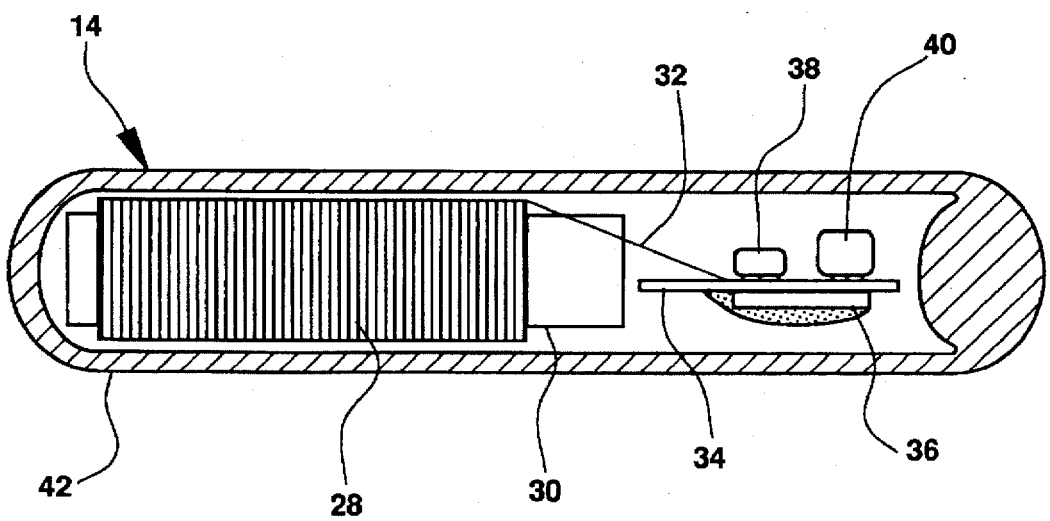
FIG. 2 is a cross-sectional elevational view of one embodiment of a transponder according to the present invention.

Referring to FIG. 2, the transponder 14 includes an antenna winding 28 which is wound about a ferrite core 30. The antenna winding 18 is electrically connected through lead lines 32 to a printed circuit board 34. The printed circuit board 34 includes an integrated circuit 36, a resonating capacitor 38, and a charge capacitor 40. The charge capacitor 40 stores the energy received from the transceiver signal 22. The resonating capacitor 38 resonates at a predetermined frequency which is used by the second signal 20 to be emitted out of the transponder 14 through the antenna windings 28. The transponder includes a capsule 42 which covers the entire transponder 14.

As stated above, due to the particular ignition key 12 and the temperature thereof, the resonating circuit consisting of the resonating capacitor 38 and an antenna 28, 30 may resonate at a frequency differing that for which it is designed. If this occurs, the transponder 14 will emit through the antenna windings 28 the second signal 20 which may not match the expected frequency by the transceiver 16. Therefore, the method of the present invention identifies such situations and corrects the frequency of the transceiver 16 to match that of the transponder 14.

More specifically, referring to FIG. 3, a method for charging the transponder 14 is generally indicated at 44. The method includes the step of powering the transceiver 16 at 46. The transceiver 16 emits a transmit pulse at 48. In one embodiment, the transmit pulse extends for a period in the range of five milliseconds and ten milliseconds. The transponder 14 receives the transmit pulse at 50. The transmit pulse partially charges the charge capacitor 40. From the partial charge, a calibration signal is generated by the resonating capacitor 38 at 52. This calibration signal is transmitted to the transceiver 16 through the antenna windings 28 at 54. In one embodiment, the calibration signal is generated by the discharging of the charge capacitor 40 of the transponder 14. It is then determined whether the frequency of the transceiver 16 matches that of the transponder 14 at 56. If not, the frequency of the transceiver 16 is calibrated. More specifically, the frequency of the transceiver 16 is shifted to match that of the transponder at 58. If so, a charge pulse from the transceiver 16 is emitted therefrom at 60. The emission of the charge pulse occurs after the frequency of the transceiver 16 is shifted if they did not originally match. The charge pulse extends for a period between forty milliseconds and fifty milliseconds and is capable of fully charging the charge capacitor 40 in the transponder 14. Once the transponder 14 is fully charged at 62, the transponder emits a coded signal at 64. The coded signal resonates at the frequency set forth by the resonating capacitor 38 and identifies the transponder 14 from which the control module 24 can identify whether the ignition key 12 is the proper ignition key and not an unauthorized copy. The method is terminated at 66.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for charging a transponder using a transceiver, the method including the steps of:

powering the transceiver;

emitting a transmit pulse from the transceiver;

powering the transponder using the transmit pulse;

generating a calibration signal with the transponder;

transmitting the calibration signal to the transceiver;

calibrating the transceiver based on the calibration signal received from the transponder;

emitting a charge pulse from the transceiver to the transponder; and charging the transponder with the charge pulse.

2. A method as set forth in claim 1 including the step of generating a coded signal using the transponder.

3. A method as set forth in claim 2 including the step of transmitting the coded signal to the transceiver to determine whether the transponder is coded to the transceiver.

4. A method as set forth in claim 1 wherein the step of generating a calibration signal includes the step of discharging the transponder.

5. A method as set forth in claim 1 wherein the transmit pulse extends for a period in a range between five milliseconds and ten milliseconds.

6. A method as set forth in claim 1 wherein the charge pulse extends for a period in the range between forty milliseconds and fifty milliseconds.

7. A method for charging a transponder using a transceiver, the method including the steps of:

emitting a transmit pulse having a first pulse period from the transceiver;

powering the transponder using the transmit pulse;

generating a calibration signal with the transponder;

transmitting the calibration signal to the transceiver;

calibrating the transceiver based on the calibration signal received from the transponder;

emitting a charge pulse from the transceiver to the transponder, the pulse having a second pulse period greater than the first pulse period for the transmit pulse; and charging the transponder with the charge pulse.

8. A method for charging a transponder using a transceiver, the method including the steps of:

emitting a transmit pulse having a first pulse period from the transceiver;

powering the transponder using the transmit pulse;

generating a calibration signal with the transponder;

transmitting the calibration signal to the transceiver;

calibrating the transceiver based on the calibration signal received from the transponder;

emitting a charge pulse from the transceiver to the transponder, the charge pulse having a second pulse period greater than the first pulse period for the transmit pulse;

charging the transponder with a charge pulse;

extending the transmit pulse for a period in the range of five milliseconds and ten milliseconds; and extending the charge pulse for a period in the range between forty milliseconds and fifty milliseconds.

9. A method as set forth in claim 8 including the step of generating a coded signal using the transponder.

10. A method as set forth in claim 9 including the step of transmitting the coded signal to the transceiver to determine whether the transponder is coded to the transceiver.

* * * * *